United States Patent [19]

Yang

[11] Patent Number: 5,545,360
[45] Date of Patent: Aug. 13, 1996

[54] PROCESS FOR PREPARING POWDERS WITH SUPERIOR HOMOGENEITY FROM AQUEOUS SOLUTIONS OF METAL NITRATES

[75] Inventor: Ning Yang, Hsinchu, Taiwan

[73] Assignee: Industrial Technology Research Institute, Hsinchu, Taiwan

[21] Appl. No.: 74,119

[22] Filed: Jun. 8, 1993

[51] Int. Cl.$^6$ ............................................ B29B 9/00
[52] U.S. Cl. ........................... 264/9; 264/64; 423/263; 423/600
[58] Field of Search ...................... 264/5, 12, 64, 264/9; 423/263, 600

[56] References Cited

U.S. PATENT DOCUMENTS

| | | | |
|---|---|---|---|
| 3,093,315 | 6/1963 | Tachiki et al. | 264/12 |
| 3,544,266 | 12/1970 | Palmour, III et al. | 423/600 |
| 3,655,330 | 4/1972 | Rettew et al. | 423/600 |
| 4,273,587 | 6/1981 | Oda et al. | 423/600 |
| 4,279,632 | 7/1981 | Frosch et al. | 264/5 |
| 4,400,431 | 8/1983 | Henslee et al. | 423/600 |
| 4,521,353 | 6/1985 | Bonnot et al. | 264/12 |
| 4,526,809 | 7/1985 | Hall et al. | 427/74 |
| 4,528,149 | 7/1985 | Wichelhaus et al. | 264/5 |
| 4,532,121 | 7/1985 | Bachelard et al. | 423/600 |
| 4,542,112 | 9/1985 | Matsui et al. | 423/600 |
| 4,582,731 | 4/1986 | Smith | 264/12 |
| 4,721,539 | 1/1988 | Ciszek | 148/442 |
| 4,905,899 | 3/1990 | Coombs et al. | 264/12 |
| 4,983,261 | 1/1991 | Schuler et al. | 205/183 |
| 5,036,037 | 7/1991 | Kladnig et al. | 502/305 |
| 5,037,577 | 8/1991 | Yamanoi et al. | 423/263 |
| 5,114,470 | 5/1992 | Biancaniello et al. | 264/12 |
| 5,198,157 | 3/1993 | Bechet | 264/9 |

FOREIGN PATENT DOCUMENTS

| | | | |
|---|---|---|---|
| 59-166605 | 9/1984 | Japan | 264/12 |
| 60-138008 | 7/1985 | Japan | 264/12 |
| 782960 | 11/1980 | U.S.S.R. | 264/12 |

OTHER PUBLICATIONS

Kazuro Nagashima, et al—"Preparation of fine Ni particles by the spray–pyrolysis techinque and their film forming properties in the thick film method"—pp. 2828–2834, J. Mat. Research (1990).

Akio Kato, et al—"Fine Powders by Spray–pyrolysis technique III. The effects of heating rate of atomized dropelets and addition of less volatile solvent on the particle shape"—pp. 13–17, 37th Spring Session—Nippon Chemical Assn (Apr. 1978).

Amer. Ceramic Bulletin, 51 (9) (Sep. 1977), pp. 692–694.

*Primary Examiner*—Allan R. Kuhns
*Attorney, Agent, or Firm*—Ladas & Parry

[57] ABSTRACT

A process for preparing a powdered product with superior homogeneity. A precursor solution is prepared by adding an additive selected from glycerol, glyceryl nitrate, polyglycerols, glycols or polyglycols with a concentration of 0.1–2.0 percent by weight to an aqueous solution of metal nitrate. The precursor solution is atomized into droplets and thereafter heat treated to obtain a powdered product of particles.

11 Claims, 15 Drawing Sheets

PROCESS FOR PREPARING POWDERS WITH SUPERIOR HOMOGENEITY FROM AQUEOUS SOLUTIONS OF METAL NITRATES

BACKGROUND OF THE INVENTION

The present invention relates to a process for preparing powders, and in particular to a process for preparing spherical hollow powders with superior homogeneity.

For better fabrication of electronic or structural ceramics, powder synthesis based on wet chemistry has gained wide attention these past few years. The high purity of starting materials, the molecular scale mixing of ingredients and the ability to control the composition precisely are all typical features of the solution process. As a consequence, better stoichiometric and microstructural control as well as extreme compositional homogeneity should be possible with the process. Various techniques using co-precipitation, sol-gel processing, freeze drying, controlled hydrolysis and high temperature pyrolysis, to name a few, were developed for the wet process. The aerosol technique, in which the well-mixed liquid precursor is nebulized into isoltated fine droplets and then reacted at a high temperature to form powders, has been evaluated to be beneficial in maintaining the homogeneity in the wet state and in eliminating the problems during calcination.

However, the homogeneity of powders prepared by the aerosol technique is still not satisfactory. For example, in the preparation of $MgAl_2O_4$ powder by aerosol method, using nitrate solutions as precursors, partial separation of MgO on the surface of aerosolized powders was observed, and the chemical homogeneity could not be restored even subjected to a post heat treatment at temperature up to 1000° C. Moreover, the shape of the particles produced by the aerosol technique are usually not perfectly spherical and the surfaces thereof are rough.

SUMMARY OF THE INVENTION

It is therefore an object of the present invention to provide a process for preparing spherical hollow powders with superior homogeneity.

In order to attain the object and according to the present invention, the process for preparing spherical powders with superior homogeneity includes (a) preparing an aqueous solution of metal nitrate; (b) adding 0.1–2.0 percent by weight of an additive selected from the group consisting of glycerol, glyceryl nitrate, polyglycerols, glycols and polyglycols to the aqueous solution to form a precursor solution; (c) atomizing the precursor solution into droplets; (d) subjecting the droplets to pyrolysis with the introduction of gases at a temperature of above 400° C. to obtain a powdered product of hollow particles; and (e) optionally, heat treating the powdered product to obtain a crystallized powdered product.

one aspect of the present invention is that the produced powders are hollow and spherical with smooth surfaces and superior homogeneity. Therefore, no impurity phases and off-stoichiometry due to segregation are observed.

Another aspect of the present invention is that only 0.1–2.0 percent by weight of additives are added to the aqueous solution of metal nitrate to form a precursor solution.

A further aspect of the present invention is that more than one metal nitrate can be used as raw material to prepare multicomponent powder materials.

BRIEF DESCRIPTION OF THE DRAWINGS

The present invention can be more fully understood by reading the subsequent detailed description of the preferred embodiment and examples with references made to the accompanying drawings, wherein.

DETAILED DESCRIPTION OF THE INVENTION

According to the present invention, more than one metal nitrate can be used as raw material to prepare the aqueous solution. For example, if NiO powders are to be produced, preferably a nickel nitrate aqueous solution in a molar concentration of 0.1 to 0.4 are prepared. If $MgAl_2O_4$ powders are to be produced, the aqueous solution can be prepared by dissolving magnesium nitrate and aluminum nitrate into water so that the resultant aqueous solution contains magnesium and aluminum ions at a molar ratio of 1:2.

The additives suitable to be used in the present process include glycerol, glyceryl nitrate, polyglycerols, glycols and polyglycols. Among them, glycerol is preferred. The amount of the additives added is 0.1–2.0 percent by weight based on the aqueous solution.

The precursor solution can be atomized by a gas stomizer or by an ultrasonic atomizer. The method of atomization is not limited to the above-mentioned two, but an ultrasonic atlomizer exciting at a frequency of 1.7 MHz is particularly suitable for the purpose of the present invention.

PREFERRED EMBODIMENT OF THE INVENTION

Figure 1:
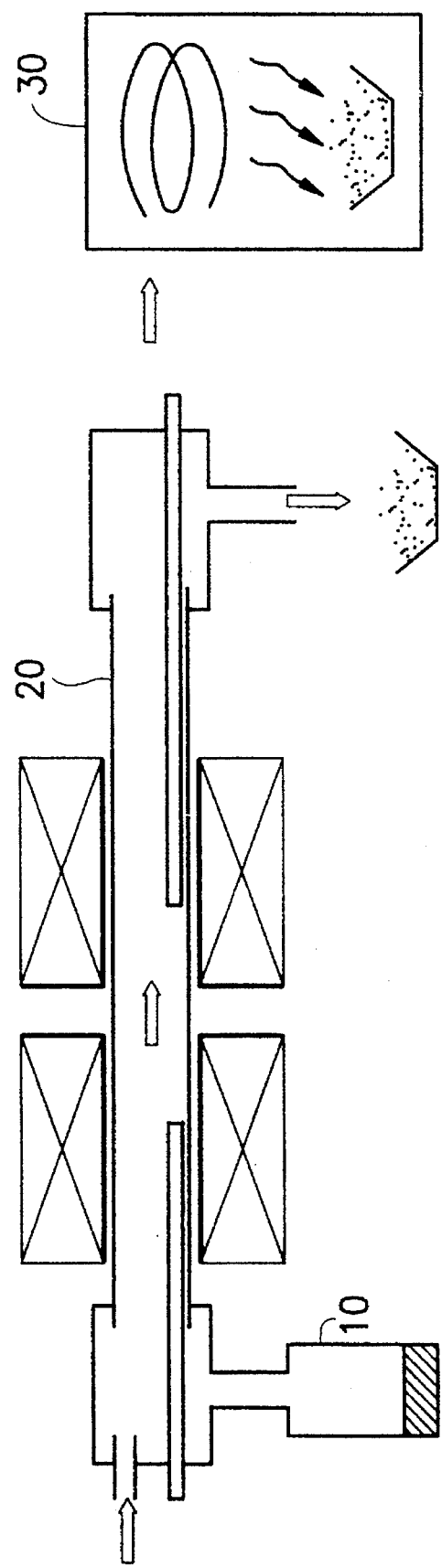
FIG. 1 is a schematic diagram of a system for producing powders according to the present invention.

Referring to FIG. 1, there is shown a schematic diagram of an apparatus usable to prepare powders by a process according to the present invention. The apparatus of FIG. 1 includes an ultrasonic atomizer 10, a reaction tube 20, and an oven 30. A precursor solution prepared for the production of powders is contained inside the ultrasonic atomizer 10 to be atomized into a flow of droplets. The atomized droplets are introduced into the reaction tube 20. Heat is subsequently applied to the reaction tube 20 for a duration long enough to obtain a powdered product. If necessary, the produced powder product is further heat treated in oven 30 to obtain a well crystallized powder product.

EXAMPLE 1

An aqueous solution having a Ni concentration of 0.29 mole/l was prepared by adding nickel nitrate to water. To the aqueous solution was then added 0.5 percent by weight of glycerol to obtain a precursor solution. The precursor solution was then atomized into a flow of droplets by the ultrasonic atomizer 10 at an excitation frequency of 1.7 MHz. The droplets flow were then guided along with air into the reaction tube 20 and heated therein at a temperature of 600° C. to obtain a mass of hollow $N_iO$ particles.

Figure 2:
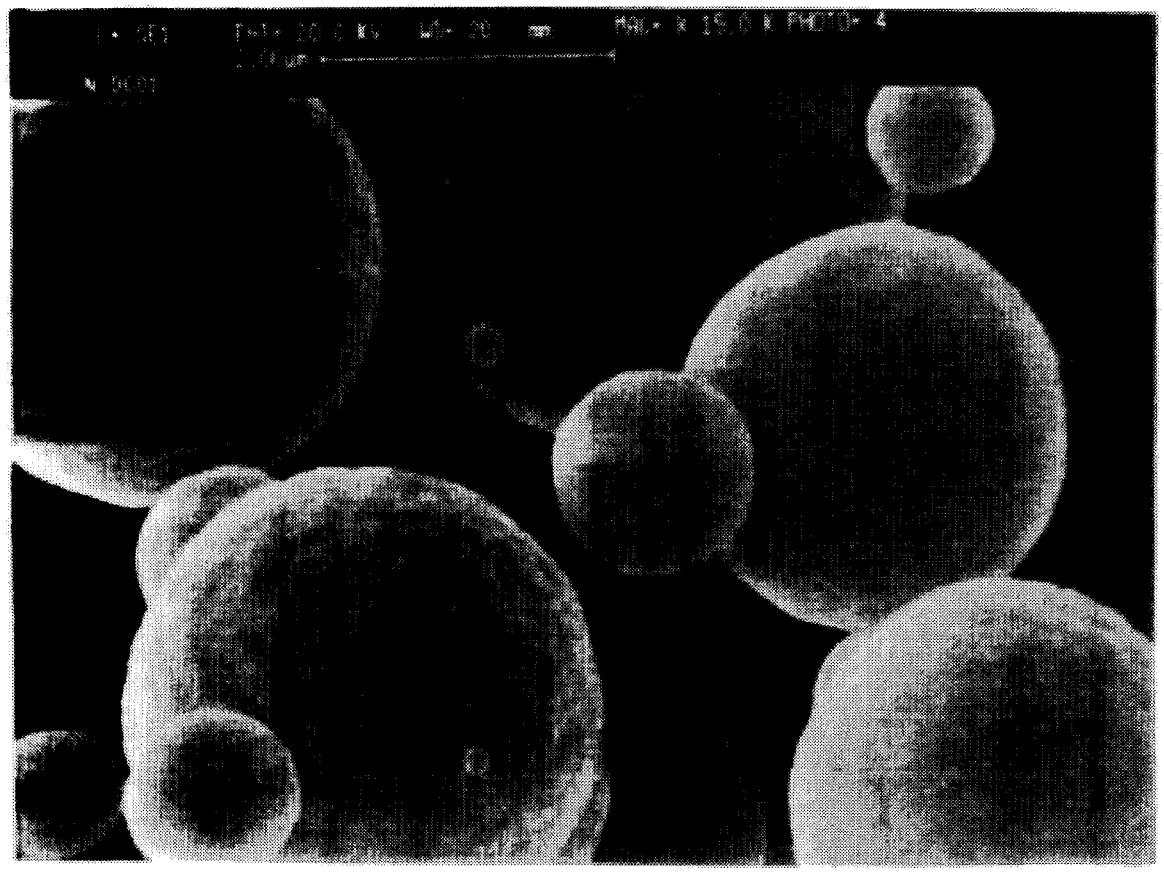
FIG. 2 shows a SEM picture of a mass of NiO particles prepared by a process according to the present invention, in which glycerol is added.
Figure 4:
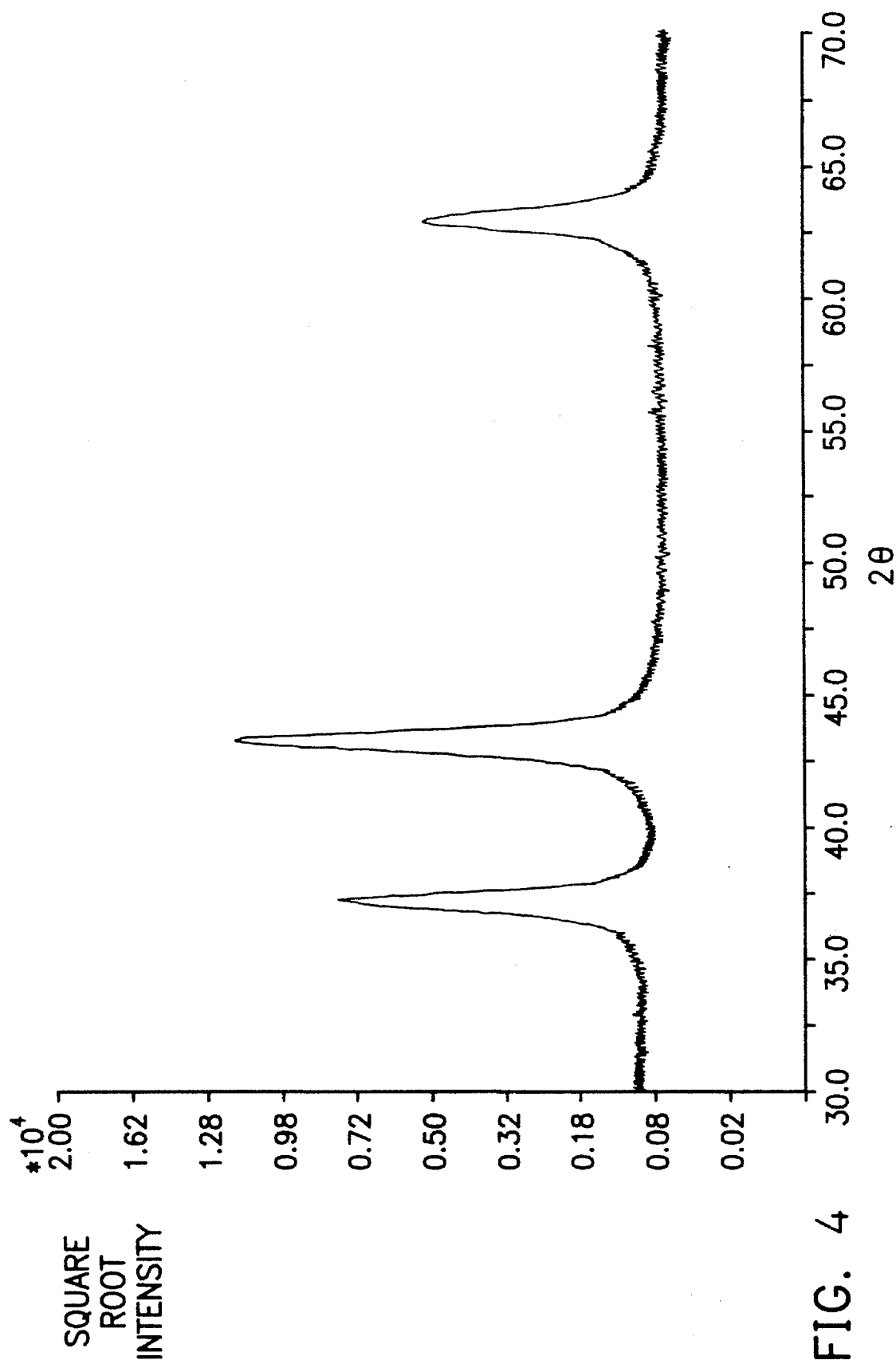
FIG. 4 shows an X-ray diffraction pattern of the NiO powders of FIG. 2.

A SEM picture at 15,000 magnification of the samples of the produced hollow NiO particles is shown in FIG. 2. As can be clearly seen from FIG. 2, the samples of hollow NiO particles are more smoothly formed and shapes of the same are closely spherical. In addition, an X-ray diffraction pattern of the samples of hollow NiO particles is shown in FIG. 4.

Figure 6:
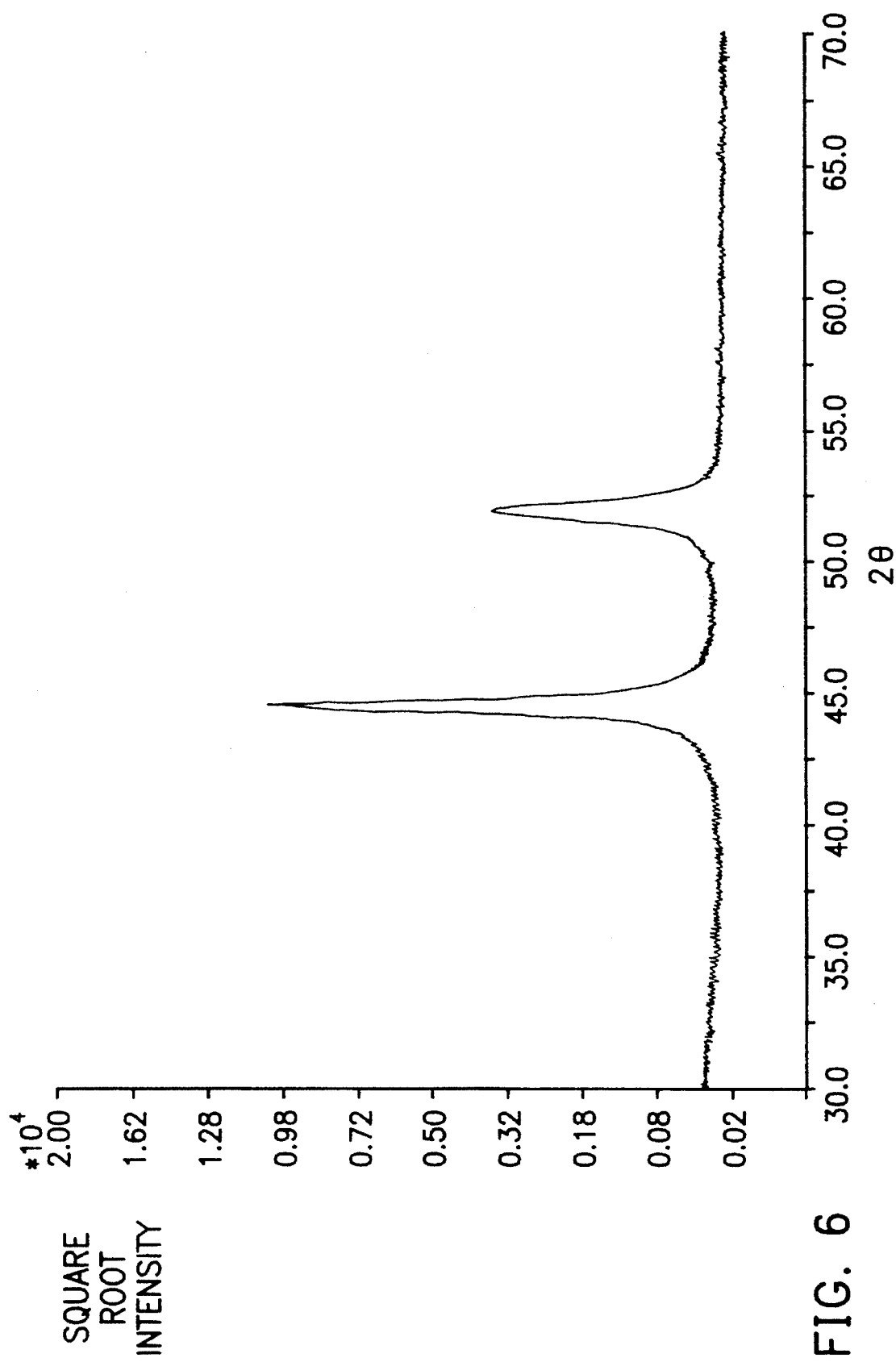
FIG. 6 shows an X-ray diffraction pattern of a mass of Ni powders prepared with the NiO powders of FIG. 2.

The hollow NiO particles were further heat treated at a temperature of 500° C. under a reducing atmosphere to obtain a crystallized powdered product of hollow Ni particles. An X-ray diffraction pattern of the crystallized hollow Ni particles is shown in FIG. 6.

COMPARATIVE EXAMPLE 1

Figure 3:
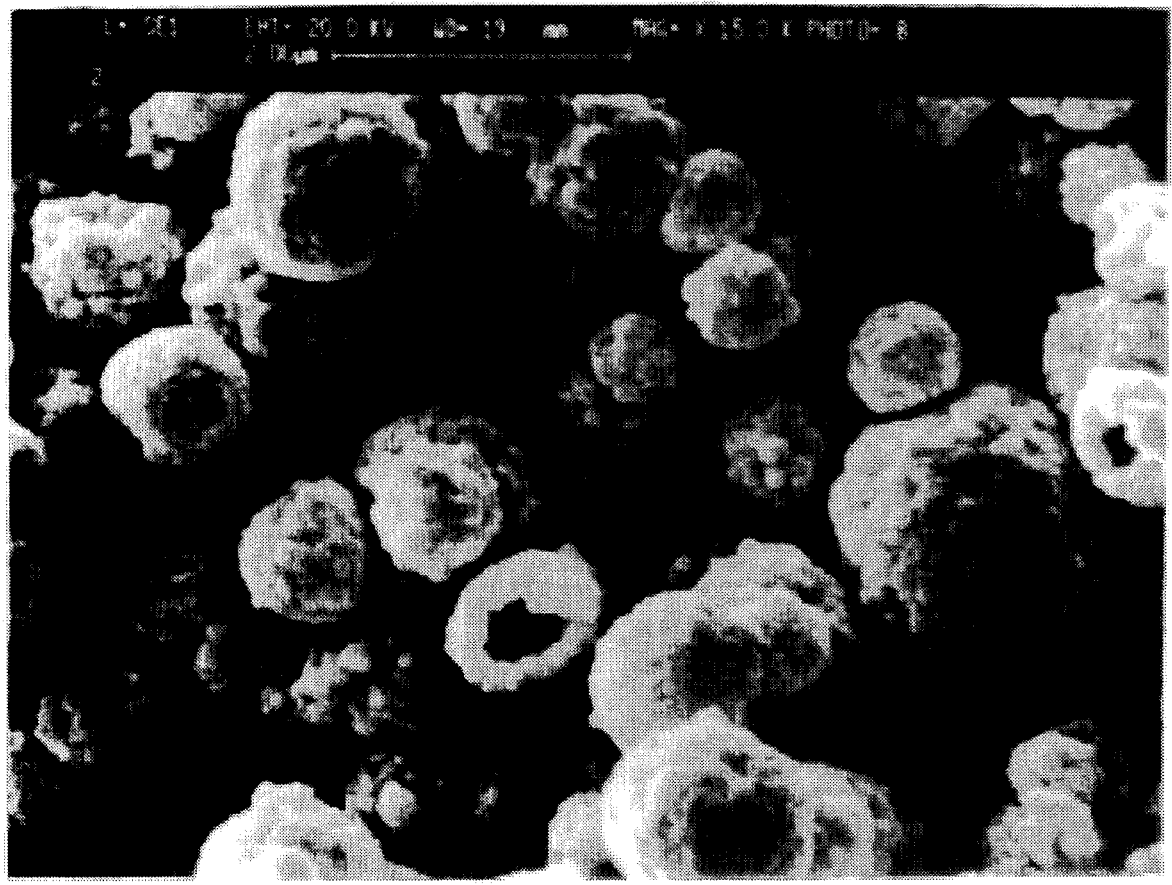
FIG. 3 shows a SEM picture of a mass of NiO particles prepared by a process in which no glycerol is used.
Figure 5:
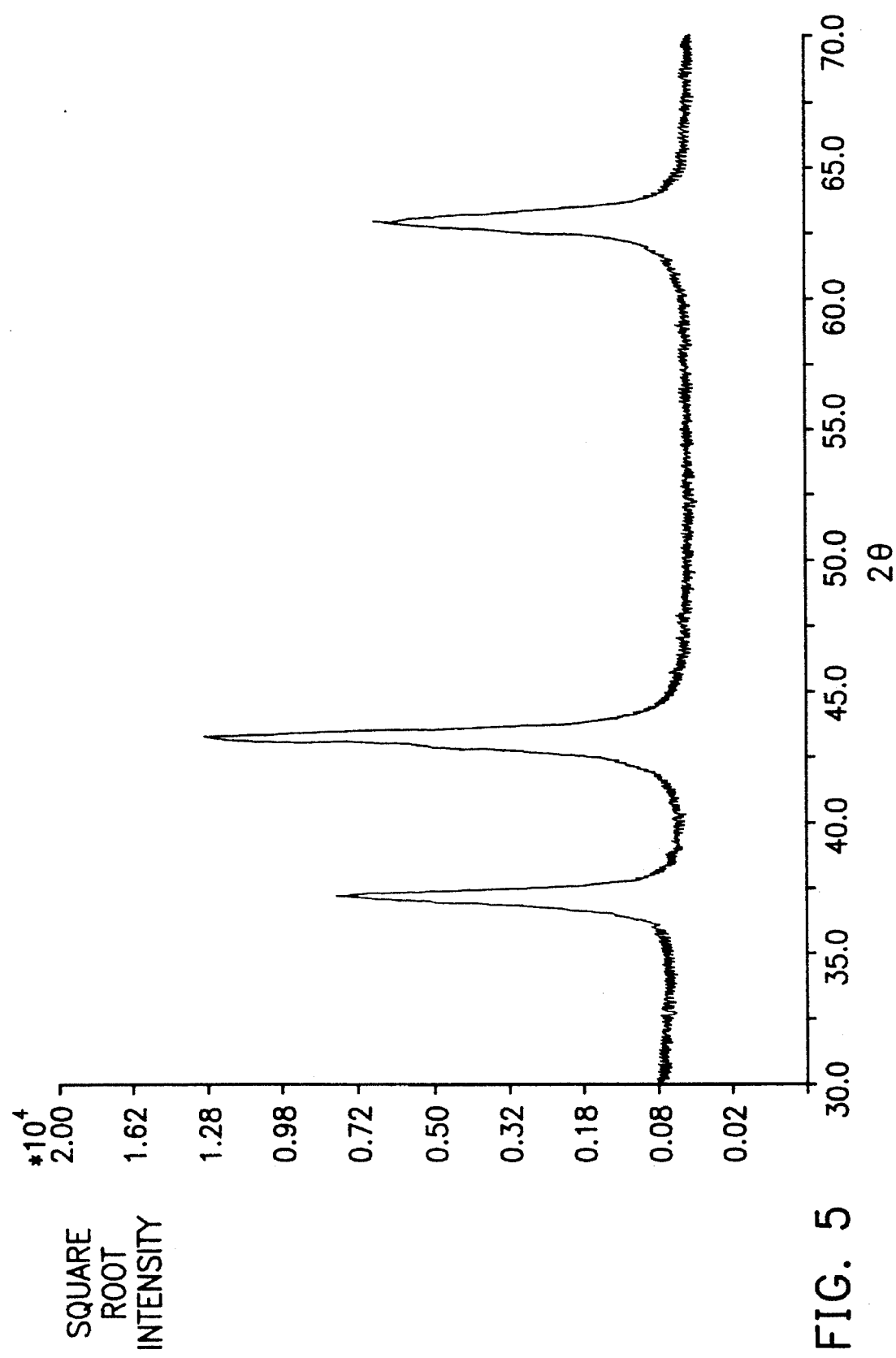
FIG. 5 shows an X-diffraction pattern of the NiO powders of FIG. 3.

A sample of powdered NiO was prepared by the same procedures as in Example 1, except no glycerol was added to the aqueous solution. A SEM picture at 15,000 magnification of this sample of hollow NiO particles is shown in FIG. 3. As can be seen from FIG. 3, the size and morphology of the samples of hollow NiO particles are irregularly formed. An X-ray diffraction pattern of the sample of hollow Ni particles is shown in FIG. 5, and is substantially the same as that shown in FIG. 4.

EXAMPLE 2

$Mg(NO_3)_2$ $6H_2O$ and $Al(NO_3)_3$ $9H_2O$ at a molar ratio of Mg:Al=1:2 were dissolved in deionized water to form 0.125M/l aqueous solution. To this aqueous solution was added 0.5 percent by weight of glycerol to obtain a presursor solution. The precursor solution was then atomized into a flow of droplets by the ultrasonic atomizer 10 at an excitation frequency of 1.7 MHz. The atomized droplets were then guided along with air into the reaction tube 20 and heated therewithin at a temperature of 600° C. to obtain a powdered product of $MgAl_2O_4$ particles.

Figure 7:
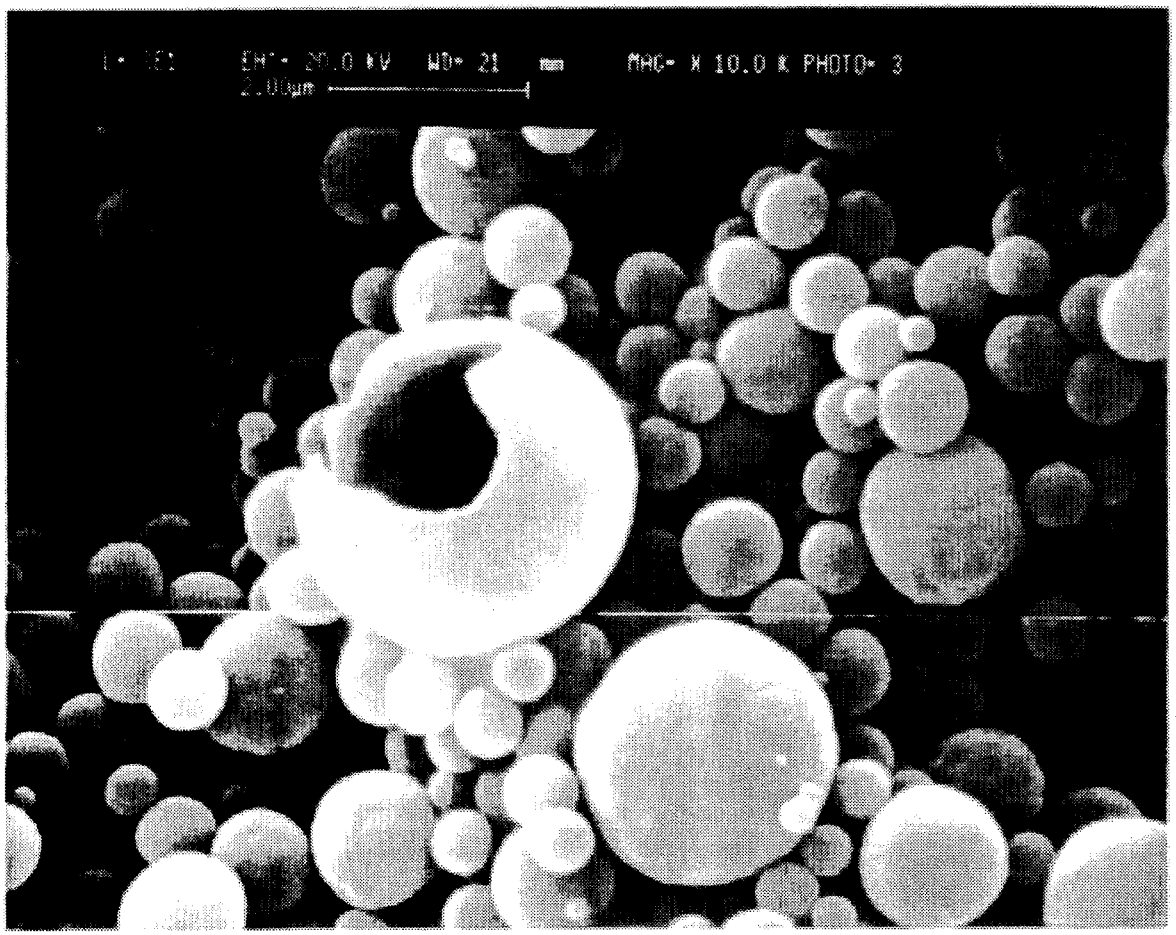
FIG. 7 shows a SEM picture of a mass of $MgAl_2O_4$ powders prepared by a process according to the present invention, in which glycerol is used.

A SEM picture at 15,000 magnification of the sample of hollow $MgAl_2O_4$ particles is shown in FIG. 7, which shows that the powders are spherical and in which the broken one indicates the powders are hollow balls with even wall thickness.

Figure 8:
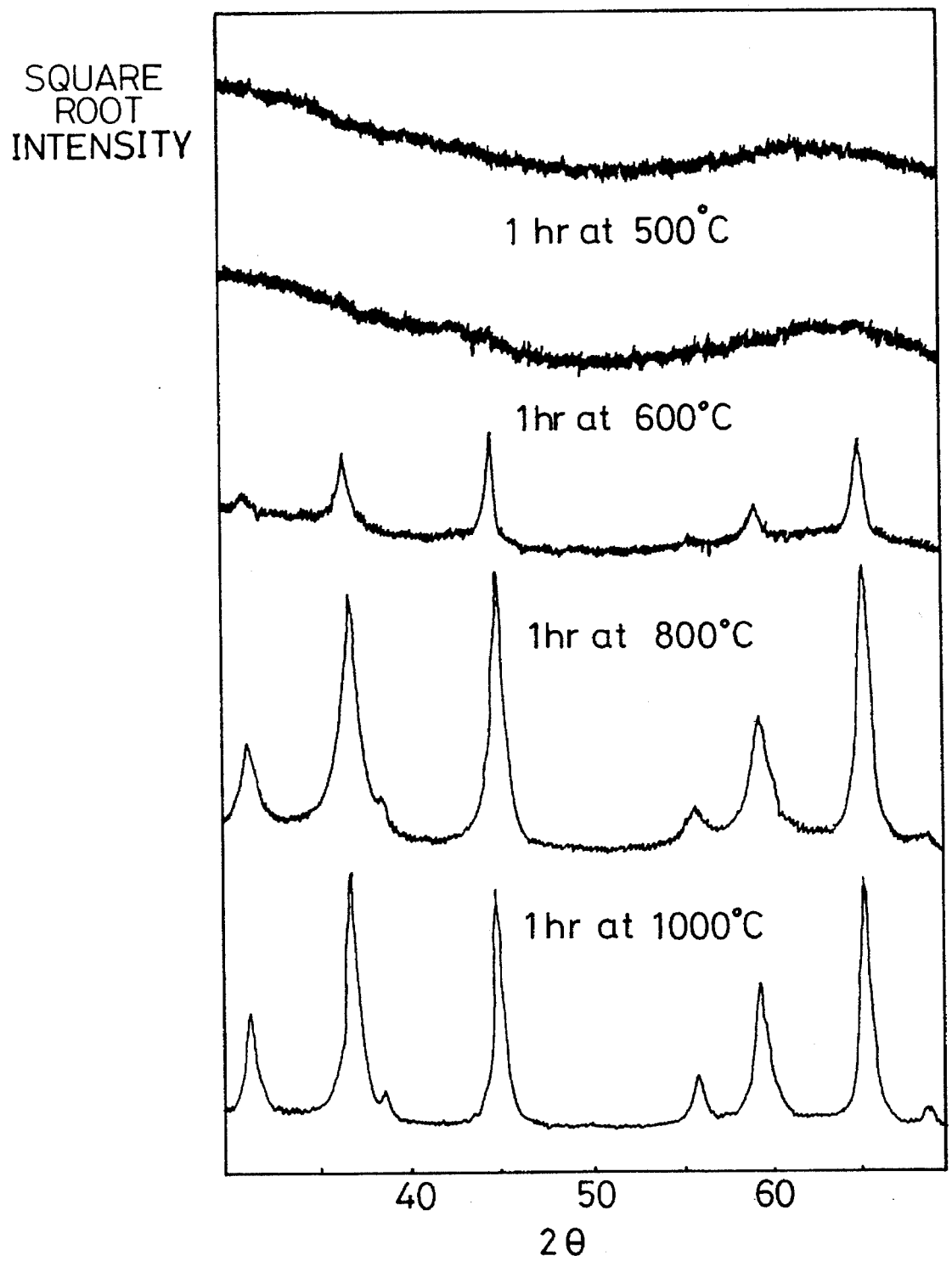
FIG. 8 is XRD pattern of samples of $MgAl_2O_4$ powders prepared by the present process after various heat treatment, in which all peaks are associated with spinel phase.

The samples of $MgAl_2O_4$ powders were subjected to heat treatment respectively at temperatures of 500° C. 600° C., 800° C., and 1000° C. for one hour. The X-ray diffraction patterns of the heat treated samples are shown in FIG. 8. As can be seen from FIG. 8, the amorphous state of the powder was hardly changed by heating at 500° C., and the spinel structure started to appear after heat treating at 600° C. As temperature rose, the spinel peaks become more clearly defined indicating growth of crystallities. The MgO phase was never detected. Accordingly, it is revealed from the XRD pattern of FIG. 8 that heat treating the sample of $MgAl_2O_4$ powders amorphous at a temperature above 800° C. would obtain well crystallized single phase $MgAl_2O_4$.

Figure 10:
FIG. 10 is a TEM picture of $MgAl_2O_4$ powders prepared by a process in which glycerol is used.

The powders were also examined under a JEOL JEM2000FX transmission electron microscope(TEM), and the TEM picture is shown in FIG. 10. As shown in FIG. 10, no surface layer exists indicating no segregation of ingredients from the bulk material.

COMPARATIVE EXAMPLE 2

Figure 9:
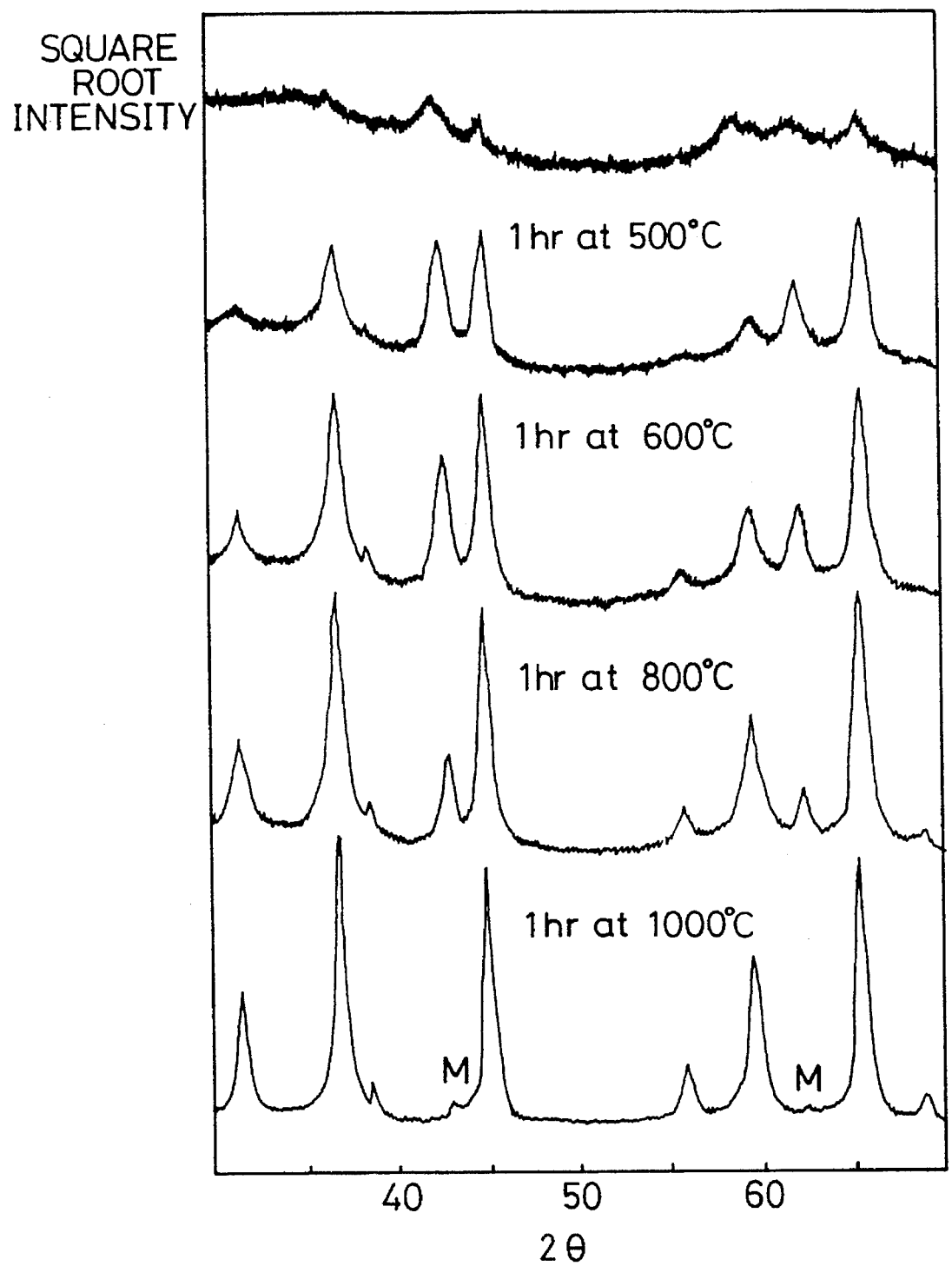
FIG. 9 is XRD pattern of samples of $MgAl_2O_4$ powders prepared by a process in which glycerol is not used, after various heat treatment, in which M indicates MgO phase and the unmarked peaks indicate spinel phase.

Samples of powdered $MgAl_2O_4$ were prepared by the same procedures as in Example 2, except no glycerol was added to the aqueous solution. These samples of hollow $MgAl_2O_4$ particles were subjected to the same heat treatments as in Example 2, and the corresponding X-ray diffraction patterns are shown in FIG. 9. As can be seen from FIG. 9, MgO and spinel phase crystallized out appreciably when heat treated at 500° C. As temperature rose, both MgO and spinel had improved crystallinity. The relative intensity of MgO peaks decreased with increasing temperature but never disappeared even after treating at 1000° C. for 1 hr. Compared with the test results of FIGS. 8A–8C, it is revealed that adding glycerine to the aqueous solution of magnesium nitrate and aluminum nitrate can eliminate impurity phases.

Figure 11:
FIG. 11 is a TEM picture of $MgAl_2O_4$ powders prepared by a process in which no glycerol is used.

The TEM picture of the powders is shown in FIG. 11. It is evident from the picture that some surface layers exist indicating the segregation of ingredients from the bulk material.

Figure 12A:
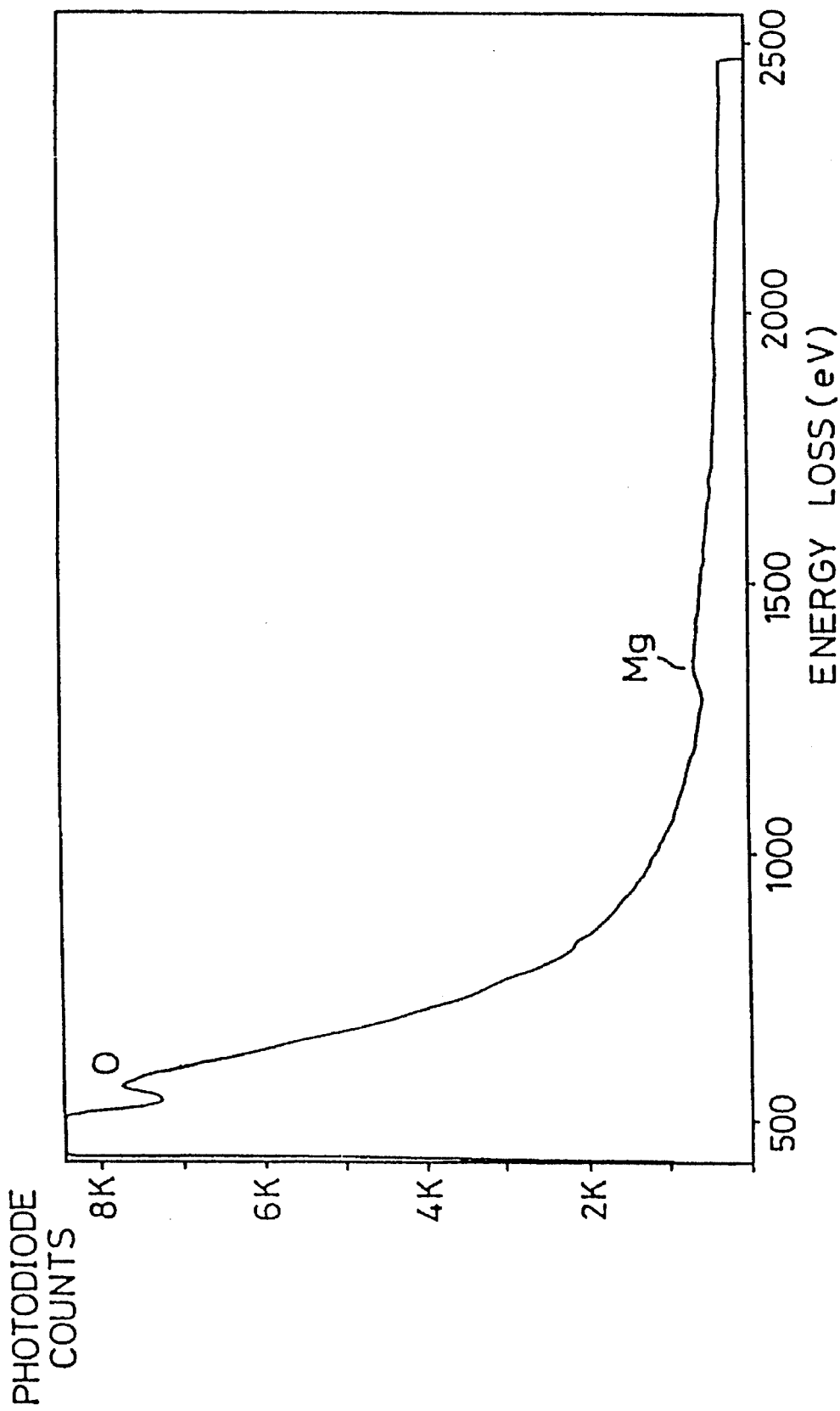
FIGS. 12a and 12b is a EELS spectrum of the powders prepared in comparative Example 2 around surface region.
Figure 12B:
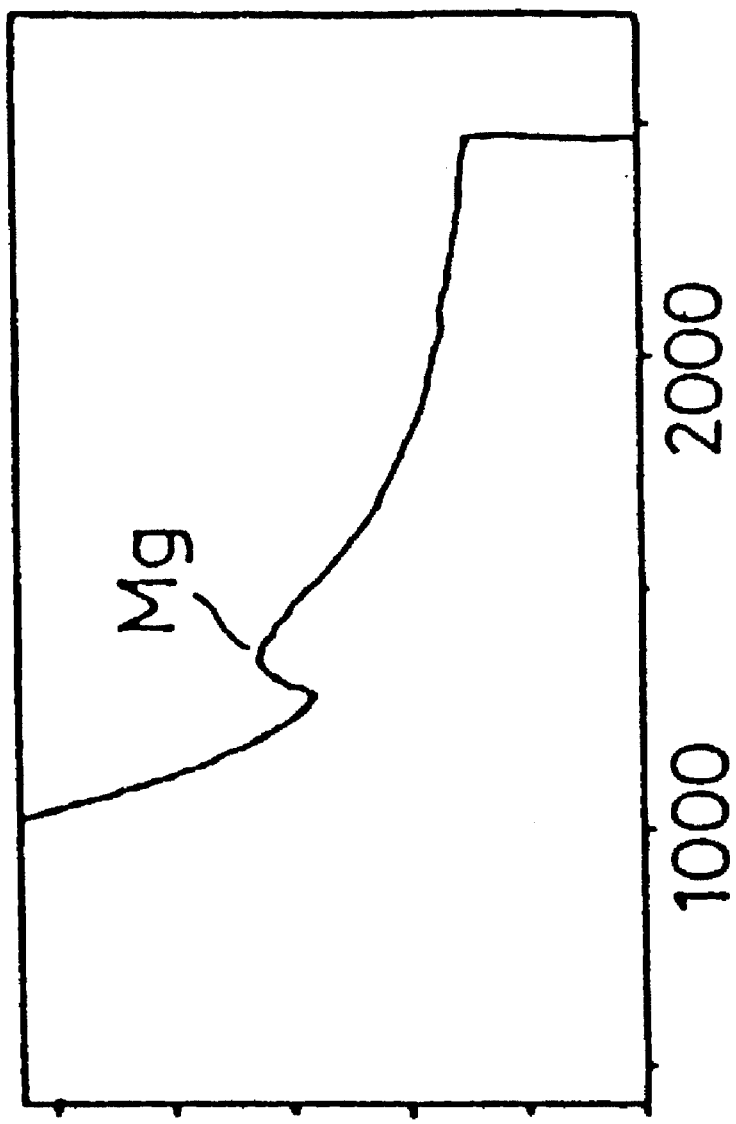

For the detailed inspection of the microstructural features of the synthesized powders, microanalysis was done with a TEM equipped with a electron energy loss spectrometer(EELS). The EELS spectrum obtained from the surface layer region around the particles is shown in FIGS. 12a and 12b. This spectrum revealed that the chemical composition consists of Mg and O. The results confirmed that partial separation from the bulk material during heating.

EXAMPLE 3

An aqueous solution having a $Y_3Al_5O_{12}$ concentration of 0.2 mole/l was prepared by dissolving yttrium nitrate and aluminum nitrate at a molar ratio of Y:Al=3:5 in water. To this aqueous solution was added 0.5 percent by weight of glycerol to obtain a precursor solution. The precursor solution was atomized into a flow of droplets by the ultrasonic atomizer 10 at an excitation frequency of 1.7 MHz. The atomized droplets were then guided along with air into the reaction tube 20 and heated therewithin at a temperature of 800° C. to obtain a powdered product of $Y_3Al_5O_{12}$ particles.

Figure 13:
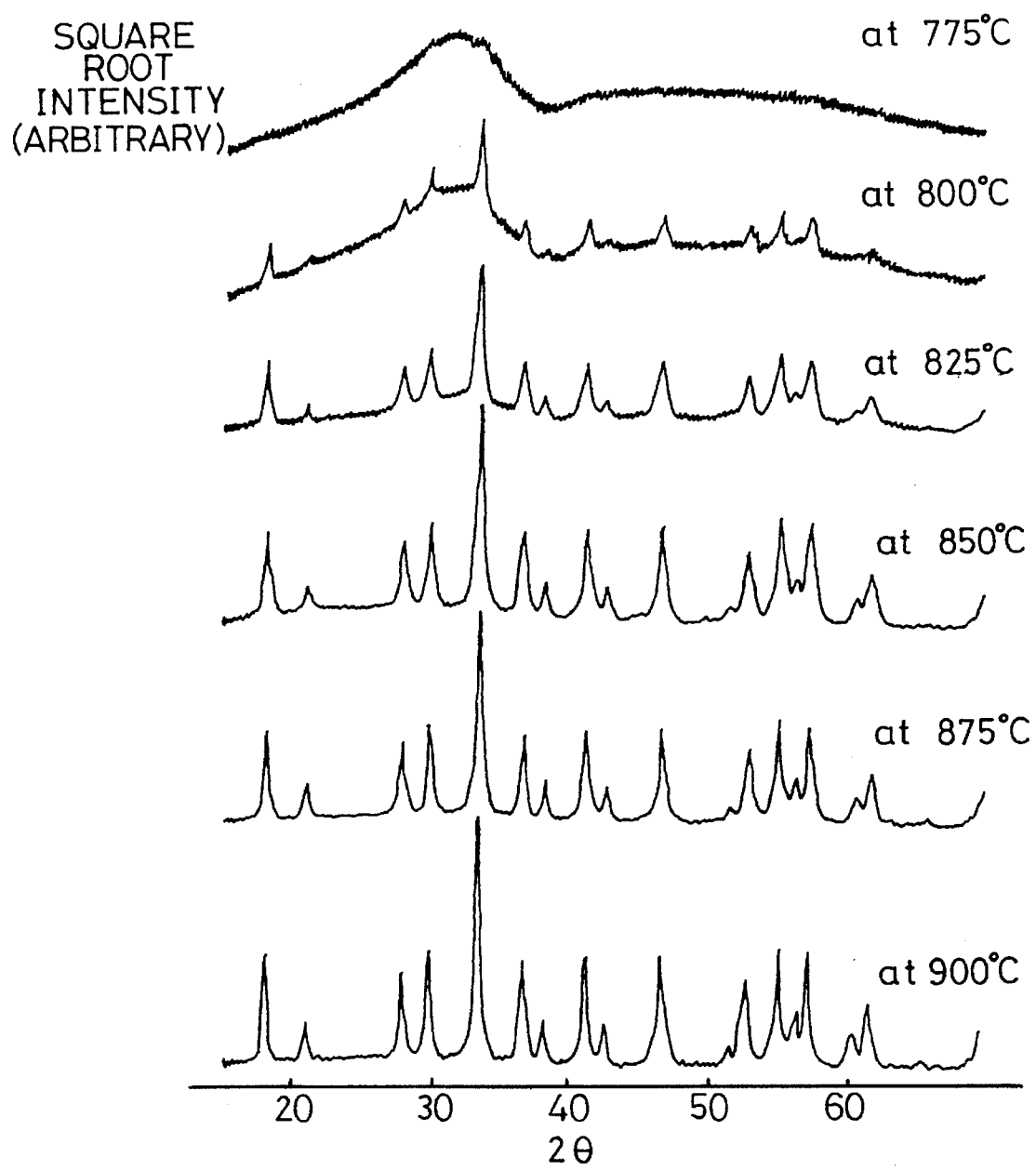
FIG. 13 is XRD pattern of heat treated $Y_3Al_5O_{12}$ powders prepared by a process according to the present invention.

The powdered product of $Y_3Al_5O_{12}$ particles were subjected to heat treatment of temperatures of 775° C., 800° C., 825° C., 850° C., 875° C., and 900° C. respectively for eight hours. The X-ray diffraction patterns of the heat treated samples are shown in FIG. 13. It can be seen from FIG. 13 that a substantially pure phase of $Y_3Al_5O_{12}$ can be obtained when heat treated at a temperature above 875° C.

COMPARATIVE EXAMPLE 3

Figure 14:
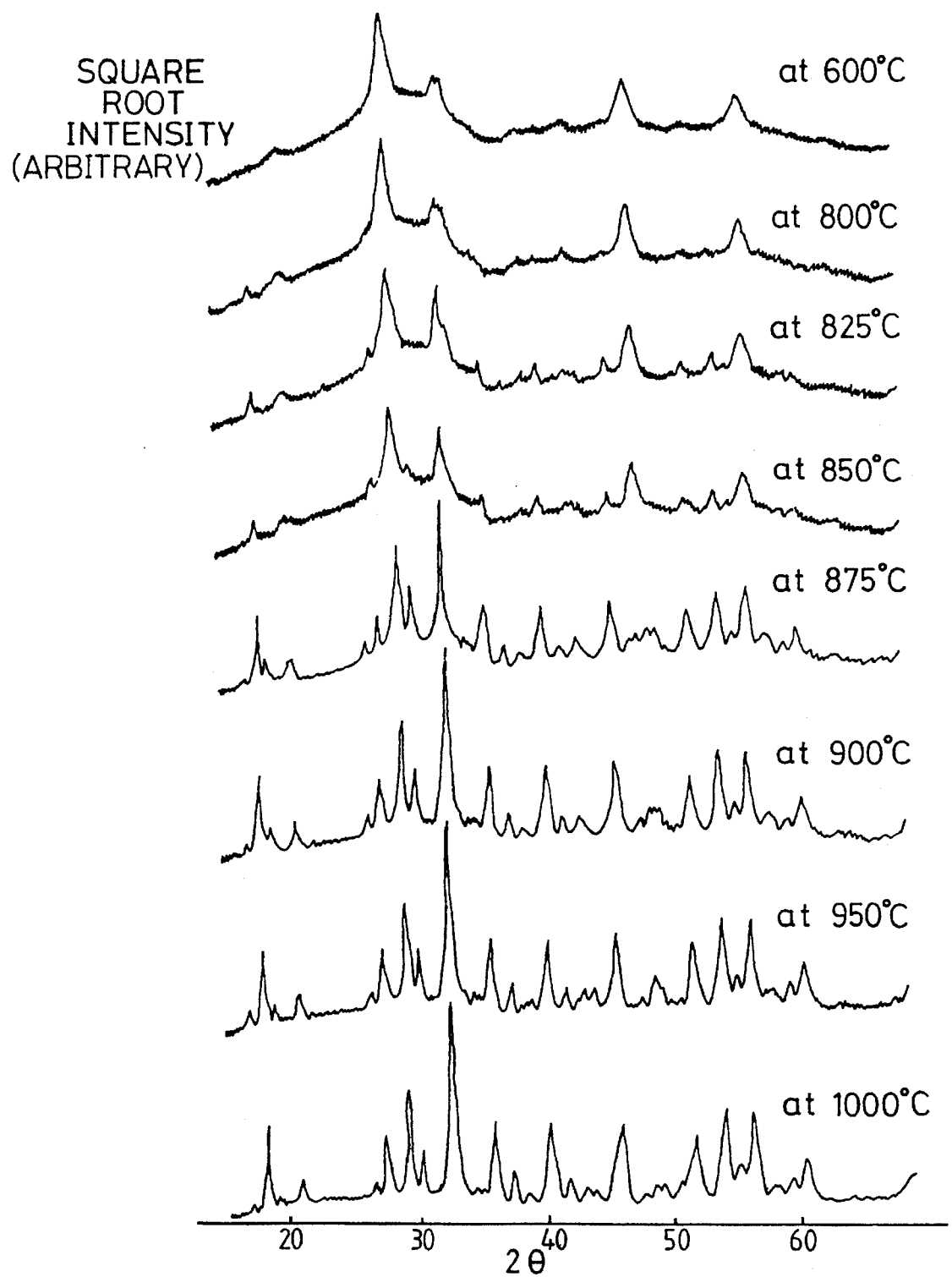
FIG. 14 is XRD pattern of heat treated $Y_3Al_5O_{12}$ powders prepared by a process in which glycerol is not used.

Samples of powdered $Y_3Al_5O_{12}$ were prepared by the same procedure as set forth in Example 3, except that no glycerol was added to the aqueous solution. The samples of powdered $Y_3Al_5O_{12}$ were respectively subjected to heat treatment at temperatures of 600° C., 800° C., 825° C., 850° C., 875° C., 900° C., 950° C., and 1000° C. respectively for 8 hours. The X-ray diffraction patterns of the heat treated samples are shown in FIG. 14. It is seen that impurity phases of $YAlO_3$, $Y_2Al_4O_9$, and $Y_2O_3$ are present along with the desired phase of $Y_3Al_5O_{12}$.

The present invention has been described hitherto with examples. However, it is to be understood that the scope of the present invention need not be limited to these disclosed examples. On the contrary, it is intended to cover variations within the scope defined in the following appended claims. The scope of the claims should be accorded the broadest interpretation so as to encompass all such variations.

What is claimed is:

1. A process for preparing homogeneous binary oxide particles, comprising the steps of:
   (a) preparing a mixture of an aqueous solution of magnesium nitrate and an aqueous solution of aluminum nitrate;
   (b) adding 0.1–2.0 percent by weight of an additive selected from the group consisting of glycerol, glycerol nitrate, polyglycerols, glycols and polyglycols to the mixture to form a precursor solution;
   (c) atomizing the precursor solution into droplets; and
   (d) subjecting the droplets to pyrolysis with the introduction of gases at a temperature above 400° C. to obtain a powdered product of hollow binary oxide particles.

2. The process as claimed in claim 1, wherein the mixture contains magnesium and aluminum ions at a molar ratio of 1 magnesium to 2 aluminum.

3. The process as claimed in claim 1, wherein the additive is glycerol.

4. The process as claimed in claim 1, wherein 0.5 percent by weight of the additive is added in step (b).

5. The process as claimed in claim 1, wherein in step (c) the precursor solution is atomized with an ultrasonic atomizer at an excitation frequency of 1.7 MHz.

6. The process as claimed in claim 1, wherein in step (d) the droplets are subjected to pyrolysis with the introduction of an oxidizing gas.

7. The process as claimed in claim 1, wherein in step (d) the droplets are subjected to pyrolysis with the introduction of a reducing gas.

8. The process as claimed in claim 1, wherein the powdered product obtained in step (d) is heat treated under an $H_2$ atmosphere at a temperature between 400° and 800° C.

9. The process as claimed in claim 1, further comprising a step (e) of heat treating the powdered product to obtain a crystallized powdered product of particles.

10. A process for preparing homogenous binary oxide particles, comprising the steps of:
    (a) preparing a mixture of an aqueous solution of yttrium nitrate and an aqueous solution of aluminum nitrate;
    (b) adding 0.1–2.0 percent by weight of an additive selected from the group consisting of glycerol, glycerol nitrate, polyglycerols, glycols and polyglycols to the mixture to form a precursor solution;
    (c) atomizing the precursor solution into droplets; and p1 (d) subjecting the droplets to pyrolysis with the introduction of gases at a temperature above 400° C. to obtain a powdered product of hollow binary oxide particles.

11. The process as claimed in claim 10, wherein the mixture contains yttrium and aluminum ions at a molar ratio of 3 yttruim to 5 aluminum.

\* \* \* \* \*